(12) United States Patent
Han et al.

(10) Patent No.: US 11,902,761 B2
(45) Date of Patent: Feb. 13, 2024

(54) SOUND PRODUCING DEVICE AND METHOD FOR DRIVING THE SAME, DISPLAY PANEL AND DISPLAY APPARATUS

(71) Applicant: BOE Technology Group Co., Ltd., Beijing (CN)

(72) Inventors: Yanling Han, Beijing (CN); Yingming Liu, Beijing (CN); Yuzhen Guo, Beijing (CN); Chenyang Zhang, Beijing (CN); Peixiao Li, Beijing (CN); Xiufeng Li, Beijing (CN); Yaqian Ji, Beijing (CN); Yue Gou, Beijing (CN); Wei Sun, Beijing (CN); Wenchao Han, Beijing (CN); Lianghao Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 21 days.

(21) Appl. No.: 17/765,225

(22) PCT Filed: May 8, 2021

(86) PCT No.: PCT/CN2021/092332
§ 371 (c)(1),
(2) Date: Mar. 30, 2022

(87) PCT Pub. No.: WO2021/227980
PCT Pub. Date: Nov. 18, 2021

(65) Prior Publication Data
US 2022/0353613 A1 Nov. 3, 2022

(30) Foreign Application Priority Data
May 14, 2020 (CN) .......................... 202010409194.6

(51) Int. Cl.
*H04R 3/12* (2006.01)
*G06F 3/01* (2006.01)
(Continued)

(52) U.S. Cl.
CPC ............... *H04R 3/12* (2013.01); *G06F 3/011* (2013.01); *H04R 1/028* (2013.01); *H04R 1/403* (2013.01);
(Continued)

(58) Field of Classification Search
CPC ........... H04S 7/302; H04S 7/303; H04R 3/12; H04R 1/028; H04R 1/403; H04R 17/00;
(Continued)

(56) References Cited

U.S. PATENT DOCUMENTS 6,628,793 B1 * 9/2003 Porzilli .................. H04R 1/403
 181/144
8,879,766 B1 * 11/2014 Zhang .................... H04R 1/028
 381/406

(Continued)

FOREIGN PATENT DOCUMENTS

CN 1774871 A 5/2006
CN 103002376 A 3/2013
(Continued)

OTHER PUBLICATIONS

First Office Action dated Jul. 14, 2021 for application No. CN 202010409194.6 with English translation attached.
(Continued)

*Primary Examiner* — Jason R Kurr
(74) *Attorney, Agent, or Firm* — Nath, Goldberg & Meyer; Joshua B. Goldberg (57) ABSTRACT

The present disclosure provides a sound producing device, a method for driving the sound producing device, a display panel and a display apparatus. The sound producing device
(Continued)

includes a recognition element, a directional sound production element and a control element, where the recognition element is connected with the control element and is configured to acquire information relating to a person in a preset range and transmit the acquired information relating to the person to the control element; the control element is connected with the directional sound production element and is configured to acquire a corresponding audio signal according to the acquired information relating to the person and control the directional sound production element to send out a sound wave according to the acquired audio signal.

17 Claims, 6 Drawing Sheets (51) Int. Cl.
H04R 1/02 (2006.01)
H04R 1/40 (2006.01)
H04R 17/00 (2006.01)
H04R 29/00 (2006.01)

(52) U.S. Cl.
CPC ........... *H04R 17/00* (2013.01); *H04R 29/002* (2013.01); *H04R 2201/028* (2013.01); *H04R 2201/401* (2013.01); *H04R 2499/15* (2013.01)

(58) Field of Classification Search
CPC ............ H04R 29/002; H04R 2201/028; H04R 2201/401; H04R 2499/15; G06F 3/011

See application file for complete search history.

(56) References Cited

U.S. PATENT DOCUMENTS

| | | | |
|---|---|---|---|
| 2010/0226499 A1* | 9/2010 | De Bruijn | H04S 7/303 381/17 |
| 2013/0077803 A1* | 3/2013 | Konno | H04R 27/00 381/387 |
| 2015/0187347 A1* | 7/2015 | Kojima | H10N 30/10516 310/322 |
| 2015/0382129 A1* | 12/2015 | Florencio | H04R 5/04 381/303 |
| 2016/0021481 A1* | 1/2016 | Johnson | H04R 5/04 381/303 |
| 2019/0124446 A1 | 4/2019 | Pan et al. | |
| 2019/0327573 A1* | 10/2019 | Maeno | H04S 7/302 |

FOREIGN PATENT DOCUMENTS

| | | |
|---|---|---|
| CN | 103165125 A | 6/2013 |
| CN | 104937660 A | 9/2015 |
| CN | 107776483 A | 3/2018 |
| CN | 108966086 A | 12/2018 |
| CN | 109032411 A | 12/2018 |
| CN | 109068245 A | 12/2018 |
| CN | 109803199 A | 5/2019 |
| CN | 110099343 A | 8/2019 |
| CN | 110112284 A | 8/2019 |
| CN | 110225439 A | 9/2019 |
| CN | 110636420 A | 12/2019 |
| CN | 111615033 A | 9/2020 |
| CN | 112216266 A | 1/2021 |

OTHER PUBLICATIONS

Second Office Action dated Jan. 13, 2022 for application No. CN 202010409194.6 with English translation attached.
Rejection of Office Action dated Apr. 19, 2022 for application No. CN 202010409194.6 with English translation attached.

* cited by examiner

SOUND PRODUCING DEVICE AND METHOD FOR DRIVING THE SAME, DISPLAY PANEL AND DISPLAY APPARATUS

CROSS REFERENCE TO RELATED APPLICATIONS

This is a National Phase Application filed under 35 U.S.C. 371 as a national stage of PCT/CN2021/092332, filed May 8, 2021, an application claiming the benefit of Chinese Patent Application No. 202010409194.6, filed May 14, 2020, the content of each of which is hereby incorporated by reference in its entirety.

TECHNICAL FIELD

The present disclosure relates to the field of sound production technology, and in particular to a sound producing device and a method for driving the same, a display panel and a display apparatus.

BACKGROUND

Sound producing devices are used in various fields, for example, the sound producing device may be provided in an intelligent display apparatus. The intelligent display apparatus can realize human-computer interaction according to pressure, texture haptic and the like, but the existing sound producing device only has a single sound production function, which has a single sound production direction and a single sound production mode, so that people receiving the sound produced by the sound producing device cannot obtain good listening experience.

BRIEF SUMMARY OF THE PRESENT DISCLOSURE

The present disclosure provides a sound producing device, including: a recognition element, a directional sound production element and a control element, where the recognition element is connected with the control element and is configured to acquire information relating to a person in a preset range and transmit the acquired information relating to the person to the control element; the control element is connected with the directional sound production element and is configured to acquire a corresponding audio signal according to the acquired information relating to the person and control the directional sound production element to send out a sound wave according to the audio signal.

In some implementations, the recognition element includes: a person number recognition module configured to acquire the number of persons in the preset range; and a position recognition module configured to acquire position information of each person with respect to the sound producing device.

In some implementations, the directional sound production element includes a sound production sensor array and an audio processing module, and the audio processing module is configured to convert the audio signal into a driving signal to drive the sound production sensor array to produce sound.

In some implementations, the sound production sensor array includes a piezoelectric transducer array.

In some implementations, the piezoelectric transducer array includes a plurality of piezoelectric sensors;

the piezoelectric transducer array includes a first substrate, an elastic film layer disposed on a side of the first substrate, a first electrode disposed on a side of the elastic film layer away from the first substrate, a piezoelectric film disposed on a side of the first electrode away from the first substrate, and a second electrode disposed on a side of the piezoelectric film away from the first substrate, where the first electrode includes a plurality of sub-electrodes, the sub-electrodes are distributed in an array and located on a side of the elastic film layer away from the first substrate, and each sub-electrode corresponds to one piezoelectric sensor;

the first substrate is provided with a plurality of openings, the openings correspond to the sub-electrodes one to one, and an orthographic projection of each sub-electrode on the first substrate falls within an orthographic projection of the opening corresponding to the sub-electrode on the first substrate.

In some implementations, the elastic film layer includes a polyimide film.

In some implementations, the sound production sensor array includes a plurality of sound production sensors, the sound production sensors being equally divided into a plurality of sensor groups, each sensor group receives a corresponding driving signal.

In some implementations, the sound production sensors are distributed in an array, and the sound production sensors in a same column or a same row are connected in series to form one of the sensor groups;

or the sound production sensors are divided into a plurality of sub-arrays, and the sound production sensors in each sub-array are connected in series to form one of the sensor groups.

In some implementations, the directional sound production element further includes:

a power amplifier, which is connected with the audio processing module and is configured to amplify the driving signal; and an impedance matching module, which is connected between the power amplifier and the sound production sensor array and is configured to match impedances of the power amplifier and the sound production sensor array to optimize the driving signal.

In some implementations, the control element includes:

a data recording module connected with the recognition element and configured to record the information relating to the person, which is transmitted by the recognition element; and an audio signal calculation module connected between the data recording module and the directional sound production element and configured to calculate an audio signal corresponding to the information relating to the person according to the information relating to the person.

In some implementations, the recognition element includes any one of a piezoelectric transduction sensor, a light pulse sensor, a structured light sensor, or a camera.

Correspondingly, the present disclosure further provides a method for driving a sound producing device, including:

acquiring, by a recognition element, information relating to a person in a preset range and transmitting the information relating to the person to a control element; and acquiring, by the control element, a corresponding audio signal according to the information relating to the person and controlling a directional sound production element to send out a sound wave according to the audio signal.

Correspondingly, the present disclosure further provides a display panel, including the above-mentioned sound producing device.

In some implementations, the sound producing device includes a directional sound production element including a sound production sensor array, the sound production sensor array includes a first substrate and a plurality of sound production sensors disposed on a side of the first substrate; the display panel includes a second substrate and a plurality of pixel units arranged on a side of the second substrate, where
the sound production sensor array and the display panel share a substrate, and the pixel units are disposed on a side of the sound production sensors away from the shared substrate.

In some implementations, the display panel further includes an adhesive layer, the sound producing device is attached to the display panel through the adhesive layer.

In some implementations, the display panel is an organic electroluminescent display panel or a mini light emitting diode display panel.

Correspondingly, the present disclosure further provides a display apparatus including the above-mentioned display panel.

DETAILED DESCRIPTION

To make the objects, technical solutions and advantages of the present disclosure more apparent, the present disclosure will be described in further detail with reference to the accompanying drawings, and it is apparent that the described embodiments are only some embodiments of the present disclosure, not all embodiments. All other embodiments obtained by a person of ordinary skill in the art based on the embodiments in the present disclosure without making creative efforts belong to the protection scope of the present disclosure.

The shapes and sizes of the components in the drawings are not to scale, but are merely intended to facilitate an understanding of the contents of the embodiments of the present disclosure.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Also, the use of the terms "a," "an," or "the" and similar referents do not denote a limitation of quantity, but rather denote the presence of at least one. The word "include" or "comprise", and the like, means that the element or item appearing in front of the word, and the equivalent thereof, contains the element or item listed after the word, but does not exclude other elements or items. The terms "connected", "coupled" and the like are not restricted to physical or mechanical connections, but may include electrical connections, whether direct or indirect. Positional relationship terms such as "on" are used only to denote relative positional relationships that may change when the absolute position of the object being described changes.

Figure 1:
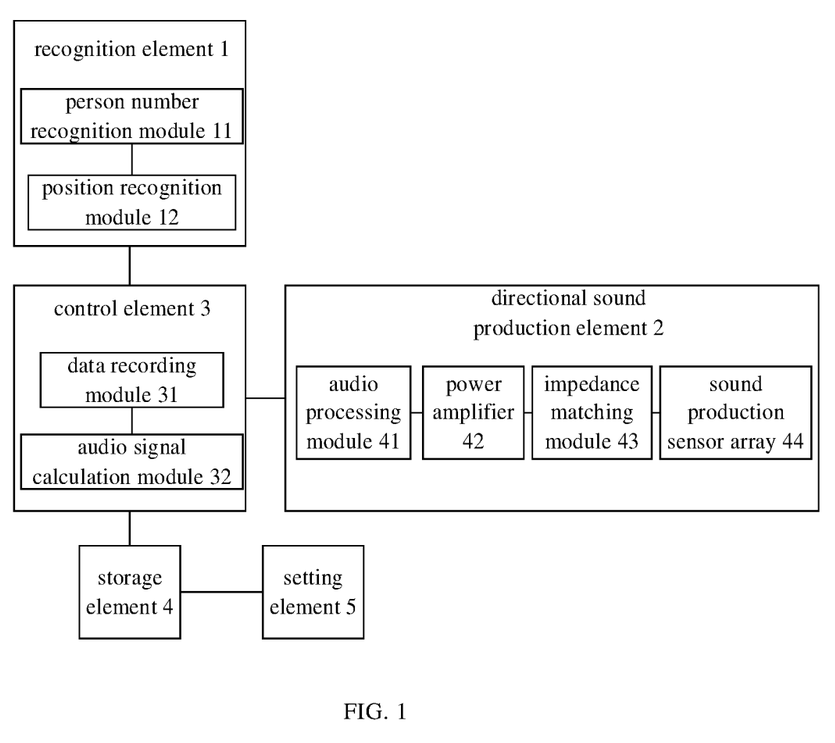
FIG. 1 is an architectural diagram of a sound producing device according to an embodiment of the present disclosure.

As shown in FIG. 1, an embodiment of the present disclosure provides a sound producing device, including: a recognition element 1, a directional sound production element 2 and a control element 3.

Specifically, the recognition element 1 is connected to the control element 3, and the directional sound production element 2 is connected to the control element 3. The recognition element 1 is configured to acquire information relating to a person or persons within a preset range, and transmit the information to the control element 3. The preset range may be set as required and according to a recognition range of the recognition element 1, for example, the preset range may be a recognition range within two meters from the recognition element 1. That is, the recognition element 1 detects the information relating to all persons within the preset range, and if multiple persons are included in the preset range, the recognition element 1 recognizes the information relating to each person, and transmits the information relating to each person to the control element 3. After receiving the information relating to the persons, the control element 3 acquires corresponding audio signals according to the information relating to the persons, and controls the directional sound production element 2 to send out sound waves according to the audio signals acquired by the control element 3, where the sound waves respectively correspond to the information relating to the persons. The recognition element 1 recognizes the information relating to the persons, then the control element 3 acquires the audio signal corresponding to each person according to the information, after that, the control element 3 controls the directional sound production element 2 to produce sound according to the acquired audio signal, so that the sound wave can be adjusted according to the person, and the sound production of the sound producing device is intelligentized.

In some implementations, as shown in FIG. 1, the information relating to the person recognized by the recognition element 1 may include various types of information, for example, the recognition element 1 may recognize the number of the person(s) included in the preset range, and may also recognize a position of each person with respect to the sound producing device. Accordingly, the recognition element 1 may include a person number recognition module 11 and a position recognition module 12, the person number recognition module 11 is configured to acquire information about the number of the person(s) within the preset range, and the position recognition module 12 is configured to acquire position information of each person within the preset range with respect to the sound producing device, that is, the information relating to the person, transmitted from the recognition element 1 to the control element 3, includes the information about the number of the person(s) and the position information of each person. Therefore, the control element 3 can calculate an angle of the sound wave to be transmitted to each person according to the position information of each person with respect to the sound producing device, generate a corresponding audio signal, and control the directional sound production element 2 to produce sound, so that each person can better receive the sound, and the control element 3 can calculate a coverage area of the sound wave according to the number of the person(s) and the position information of each person, so that the sound wave sent out by the directional sound production element 2 can cover all persons in the preset range, and the listening experience of each person is further improved.

In some implementations, the recognition element 1 may include multiple types of recognition devices, for example, a somatosensory recognition device may be adopted, and an image recognition device may also be adopted. For example, the recognition element 1 may include any one of a piezoelectric transduction sensor, an optical pulse sensor, a structured light sensor, or a camera.

Specifically, if the recognition element 1 is a piezoelectric transduction sensor, the piezoelectric transduction sensor can transmit an ultrasonic wave, the ultrasonic wave would be reflected when encountering a person, the piezoelectric transduction sensor detects the reflected ultrasonic wave, namely, detects an echo signal, so as to recognize the information about the number of the person(s) and the position information of each person within the preset range. The recognition element 1 may adopt the optical pulse sensor, and perform recognition by using a Time Of Flight (TOF) technology, where the optical pulse sensor may transmit an optical pulse into the preset range, and if there is a person or persons in the preset range, the person would reflect the optical pulse, and the information about the number of the person(s) and the position information of each person may be obtained by detecting the time of flight (round trip) of the optical pulse. If the recognition element 1 adopts the structured light sensor, the structured light sensor may include a camera and a projector, active structure information, such as laser stripes, gray codes, sine stripes, etc., is projected to the person by the projector, and then a surface to be measured is captured by a single or multiple cameras to acquire a structured light image, and then a three-dimensional image of the person can be acquired based on a triangulation principle, that is, position information of each person and the information about the number of the person(s) can be recognized. The recognition element 1 may also adopt a camera for recognition, for example, a binocular recognition technology may be used by adopting dual cameras, and the information about the number of the person(s) and the position information of each person within the preset range can be recognized through images collected by the dual cameras. Certainly, the recognition element 1 may also perform recognition in other ways, and may be specifically designed as required, which is not limited herein.

In some implementations, as shown in FIG. 1, the directional sound production element 2 may include a sound production sensor array 44 and an audio processing module 41, and the audio processing module 41 is configured to convert the audio signal transmitted by the control element 3 into a driving signal, and transmit the driving signal to the sound production sensor array 44, to drive the sound production sensor array 44 to produce sound. The driving signal may include an angle at which the sound wave propagates, specifically, for example, the driving signal may include a timing at which sound production sensors in the sound production sensor array 44 transmit the sound waves, and the sound production direction of the sound production sensor array 44 may be adjusted by means of phase delays of the sound waves transmitted by the sound production sensors.

In some implementations, the sound production sensor array 44 may include multiple types of sensors, for example, the sound production sensor array 44 is a piezoelectric transducer array, i.e., the sound production sensor array 44 includes multiple piezoelectric transducers. Certainly, the sound production sensor array 44 may also be other types of sensor arrays, and may be specifically configured as required, which is not limited herein.

Figure 2:
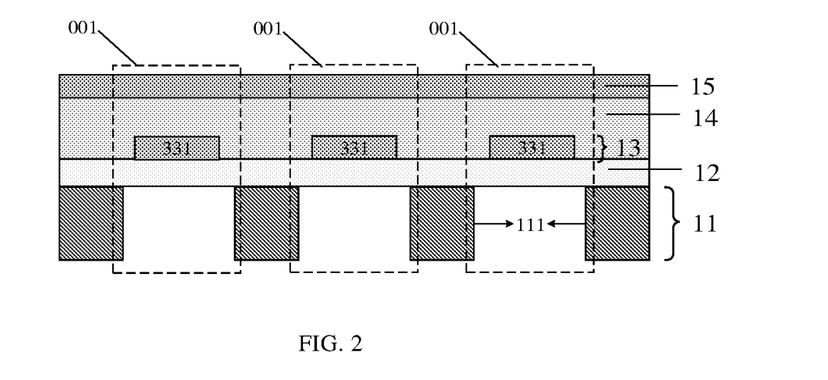
FIG. 2 is a schematic structural diagram of a sound production sensor array in a sound producing device according to an embodiment of the present disclosure.

Further, as shown in FIG. 2, if the sound production sensor array 44 is the piezoelectric transducer array, the piezoelectric transducer array includes a plurality of piezoelectric sensors. Specifically, the piezoelectric transducer array includes a first substrate 11, an elastic film layer 12 on a side of the first substrate 11, a first electrode 13 on a side of the elastic film layer 12 away from the first substrate 11, a piezoelectric film 14 on a side of the first electrode 13 away from the first substrate 11, and a second electrode 15 on a side of the piezoelectric film 14 away from the first substrate 11.

The elastic film layer 12 serves as an elastic auxiliary film for the sound production sensor array 44 (piezoelectric transducer array) and is configured to enhance a vibration amplitude of the piezoelectric film 14. The second electrode 15 may be a sheet electrode, which covers an entire area of the first substrate 11, the first electrode 13 includes a plurality of sub-electrodes 331, the sub-electrodes 331 are distributed in an array and are disposed on a side of the elastic film layer 12 away from the first substrate 11, each sub-electrode 331 corresponds to one piezoelectric sensor 001, that is, the sub-electrode 331 and parts, corresponding to the sub-electrode 331, of the films on a side of the sub-electrode 331 away from the first substrate 11 form one piezoelectric sensor 001, the sound production sensor array 44 has a function of a speaker, and the sub-electrodes 331, the piezoelectric film 14 and the elastic film layer 12 together form a diaphragm of the sound production sensor array 44 (speaker) for sending out sound waves. The first substrate 11 has a plurality of openings 111 therein, the openings 111 serve as chambers of the sound production sensor array 44 (speaker), the openings 111 correspond to the sub-electrodes 331 one to one, and an orthographic projection of each sub-electrode 331 on the first substrate 11 is located within an orthographic projection of the opening 111 corresponding to the sub-electrode 331 on the first substrate 11, so that sound waves can be sent out through the openings 111 serving as the chambers. The openings 111 being formed in the first substrate 11 can make the first substrate 11, the elastic film layer 12 and the piezoelectric film 14 form a suspended diaphragm structure.

In some implementations, the openings 111 may be formed in the first substrate 11 by using laser drilling, hydrofluoric acid etching drilling, or other methods.

In some implementations, the first substrate 11 may be various types of substrates, for example, the first substrate 11 may be a glass substrate. The elastic film layer 12 may be various types of elastic film layers, for example, the elastic film layer may be a polyimide (PI) film, and certainly, the elastic film layer 12 may also be made of other materials, which is not limited herein.

In some implementations, the piezoelectric transducer array may be a Micro-Electro-Mechanic al System (MEMS) piezoelectric transducer array.

Figure 3:
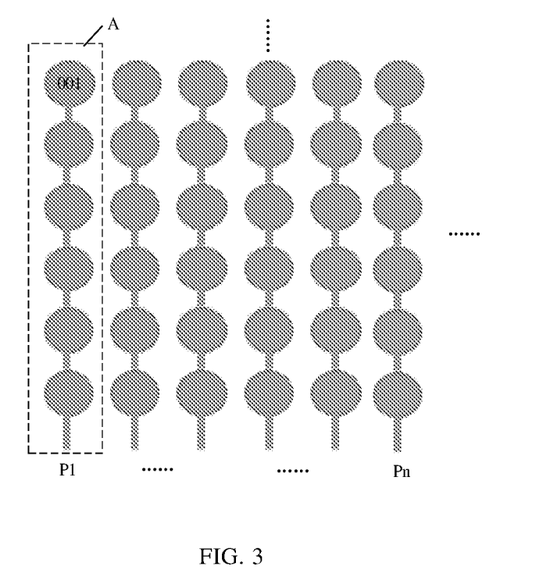
FIG. 3 illustrates a grouping mode of sound production sensors in a sound producing device according to an embodiment of the present disclosure.
Figure 4:
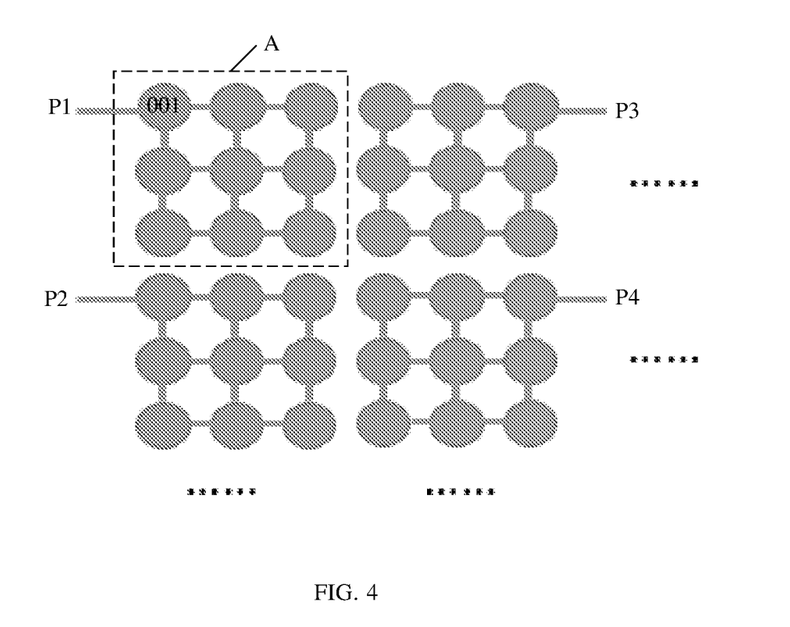
FIG. 4 illustrates another grouping mode of sound production sensors in a sound producing device according to an embodiment of the present disclosure.

In some implementations, as shown in FIGS. 3 and 4, the sound production sensor array 44 includes a plurality of sound production sensors, in the figures, a case where the sound production sensors are piezoelectric sensors 001 is taken as an example, a plurality of piezoelectric sensors 001 are distributed in an array and are disposed on the first substrate 11, and for convenience of description, specific structures of the piezoelectric sensors 001 are omitted in FIGS. 3 and 4, and the piezoelectric sensors 001 are indicated by circle patterns. The piezoelectric sensors 001 are equally divided into a plurality of sensor groups, each sensor group correspondingly receives one driving signal transmitted by the audio processing module 41, that is, the sound production sensors in the sound production sensor array 44 are controlled by driving the sound production sensors group by group, so that the number of driving lines leading to the sensor groups can be reduced, the structure of the sound production sensor array 44 is simplified, and one entire sensor group may be used for propagating a sound wave in one direction, so that a larger coverage area of the sound wave can be obtained compared with the case that only one sensor is used for propagating the sound wave in one direction. Moreover, the sound waves can be conveniently adjusted according to a distance between the person and the sound producing device, for example, if the person is closer to the sensors on a center line of the sound production sensor array 44, the sensor group on the center line may be used to produce sound to increase the coverage area of the sound wave.

In particular, the sound production sensors may be grouped in a variety of ways. The following description will be given by taking first and second modes as examples.

First Mode

Referring to FIG. 3, Taking the Sound Production Sensors being the Piezoelectric sensors 001 as an example, the piezoelectric sensors 001 are distributed in an array, the piezoelectric sensors 001 in a same column (FIG. 3) or in a same row form a sensor group A, the piezoelectric sensors 001 in each sensor group A are connected in series, and the sensor groups A correspond to driving signals (for example, the driving signals P1 . . . Pn in FIG. 3) one to one.

Second Mode

Referring to FIG. 4, taking the sound production sensors being the piezoelectric sensors 001 as an example, the piezoelectric sensors 001 are distributed in an array, the piezoelectric sensors 001 are divided into a plurality of sub-arrays, the piezoelectric sensors 001 in each sub-array form a sensor group A, the piezoelectric sensors 001 in each sensor group A are connected in series, and the sensor groups A correspond to driving signals (for example, the driving signals P1 . . . P4 . . . in FIG. 4) one to one.

Certainly, the sound production sensors in the sound production sensor array 44 may be grouped in other modes, and the above modes are merely illustrative but not limiting.

In some implementations, as shown in FIG. 1, the directional sound production element 2 further includes a power amplifier 42 and an impedance matching module 43. The power amplifier 42 is connected to the audio processing module 41, and the power amplifier 42 is configured to amplify the driving signal transmitted by the audio processing module 41. The impedance matching module 43 is connected between the power amplifier 42 and the sound production sensor array 44, and the impedance matching module 43 is configured to match the impedances of the power amplifier 42 and the sound production sensor array 44, and the impedances of the power amplifier 42 and/or the sound production sensor array 44 are adjusted to match each other, so as to achieve a maximum amplification effect on the driving signal, thereby optimizing the driving signal. The power amplifier 42 and impedance matching module 43 cooperate to optimize the drive signal, so as to maximize the driving signal and transmit it to the sound production sensor array 44.

In some implementations, as shown in FIG. 1, the control element 3 includes a data recording module 31 and an audio signal calculation module 32. The data recording module 31 is connected to the recognition element 1, and the data recording module 31 is configured to record the information relating to the person, transmitted by the recognition element 1, and transmit the recorded information to the audio signal calculation module 32. The audio signal calculation module 32 is connected between the data recording module 31 and the directional sound production element 2, and the audio signal calculation module 32 is configured to calculate an audio signal corresponding to the information relating to the person according to the acquired information relating to the person. The sound production sensor array 44 of the sound producing device provided in the embodiment of present disclosure can drive the sound production sensors to produce sound in various ways, and the audio signal calculation module 32 calculates the audio signal according to a preset algorithm, so as to adjust the sound wave corresponding to an angle of the person according to the position information of the person, and calculates a required coverage area of the sound wave according to the information about the number of the person(s) and the position information of each person.

In some implementations, the sound producing device provided by the embodiment of the present disclosure further includes a storage element 4 and a setting element 5. The storage element 4 is connected to the control element 3, and the setting element 5 is connected to the storage element 4. The sound producing device provided by the present disclosure may produce sound in various modes, such as a single-person mode and a multi-person mode, and sound production modes of the sound producing device may be set through the setting element 5, and settings are stored in the storage element 4. The setting element 5 may also perform initialization setting on the sound producing device and store initialization settings in the storage element 4, and the control element 3 may read information about the settings from the storage element 4 and set the sound producing device accordingly.

Figure 5:
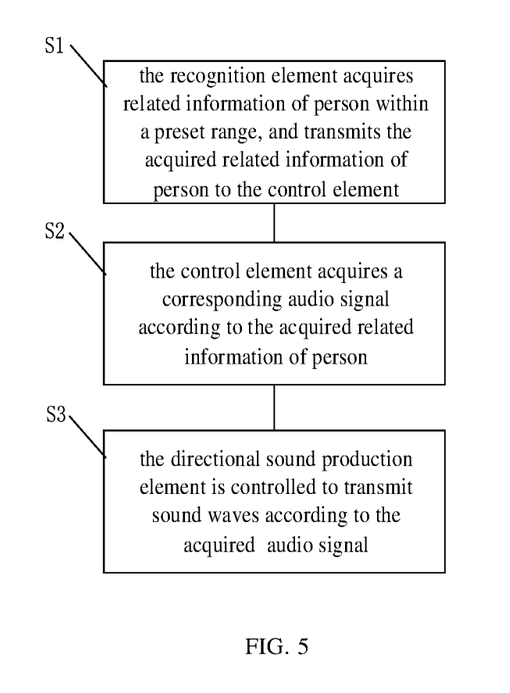
FIG. 5 is a flowchart of a method for driving a sound producing device according to an embodiment of the present disclosure.

Accordingly, as shown in FIG. 5, the present disclosure further provides a method for driving a sound producing device, including the following steps S1 to S3.

At S1, the recognition element 1 acquires information relating to a person within a preset range, and transmits the acquired information relating to the person to the control element 3.

Specifically, the information relating to the person recognized (or acquired) by the recognition element 1 includes the number of person(s) included in the preset range (i.e., information about the number of the person(s)), and position information of each person in the preset range with respect to the sound producing device (e.g., an angle of the person with respect to a center line of the sound producing device), and the recognition element 1 transmits the recognized information relating to the person to the control element 3.

At S2, the control element 3 acquires a corresponding audio signal according to the acquired information relating to the person.

Specifically, the control element 3 includes a data recording module 31 and an audio signal calculation module 32, where the audio signal calculation module 32 calculates an audio signal corresponding to the acquired information relating to the person according to a preset algorithm, and the preset algorithm is set according to a sound production mode adopted by the sound producing device. The following description will be given by taking a case where the sound producing device controls each of the sound production sensors in the sound production sensor array 44 by using an acoustic phased array method and an acoustic parametric array method as an example.

Figure 6:
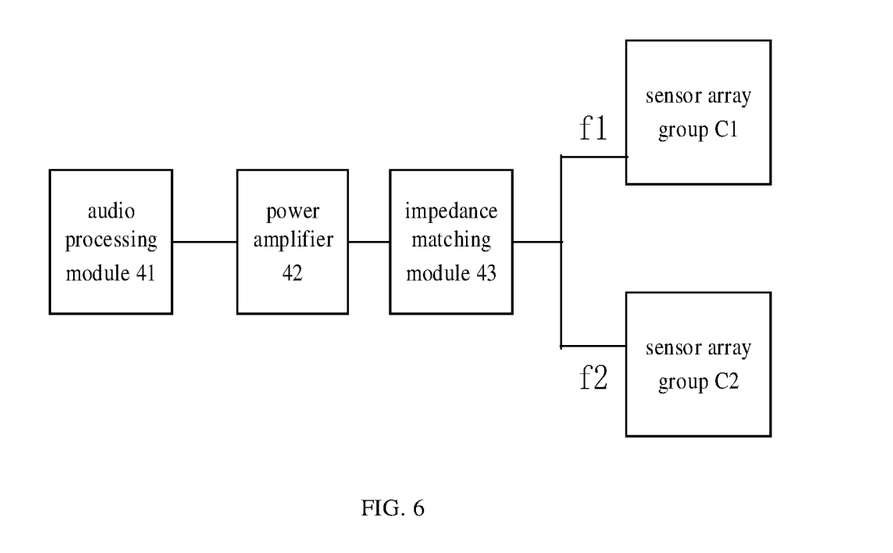
FIG. 6 is a schematic diagram of an operation of an acoustic parametric array method in a method for driving a sound producing device according to an embodiment of the present disclosure.
Figure 7:
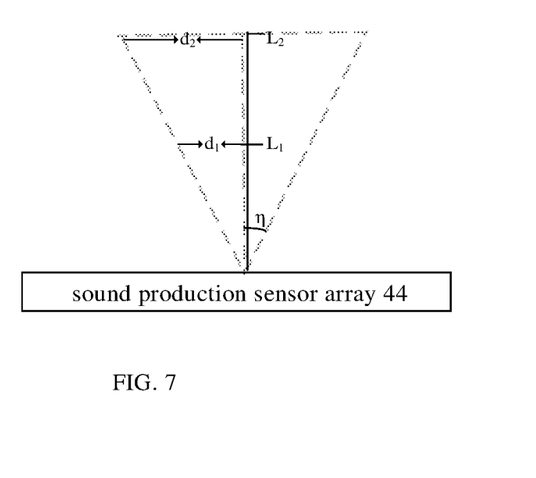
FIG. 7 is a schematic diagram of a coverage area of a sound wave in an acoustic parametric array method in a method for driving a sound producing device according to an embodiment of the present disclosure.

Specifically, referring to FIGS. 6 and 7, since the propagation directivity of audible sound is relatively low, the sound producing device may drive each sound production sensor in the sound production sensor array 44 by using the acoustic parametric array method to improve the directivity of sound waves. Referring to FIG. 6, the sound production sensors in the sound production sensor array 44 may be divided into a sensor array group C1 and a sensor array group C2 which are respectively at both sides of a center line of the sound production sensor array 44, the control element 3 controls the audio processing module 41 to generate two driving signals, a first one of the driving signals is optimized by the power amplifier 42 and the impedance matching module 43 and then transmitted to the sensor array group C1 to drive the driving sensor array group C1 to send out an ultrasonic wave with a frequency of f1, a second one of the driving signals is transmitted to the sensor array group C2 through the power amplifier 42 and the impedance matching module 43 to drive the sensor array group C2 to send out an ultrasonic wave with a frequency of f2, where f1 is different from f2, so that after the two ultrasonic waves with different frequencies interact nonlinearly in air, a sound wave that can be heard by human ears (referred to as "audible sound" for short) is modulated and generated. Since the ultrasonic wave is sharper than the sound wave of the audible sound, the ultrasonic wave has stronger directivity, and the directivity of the audible sound can be enhanced by driving the sound production sensor array 44 to produce sound by adopting the acoustic parametric array method.

Further, the control element 3 may determine the directivity of the sound wave sent out by the sound production sensor array 44, which is driven by using the acoustic parametric array method, based on an arrangement of the sound production sensor array 44 according to the following array directivity function $D(\alpha, \theta)$:

$$D(\alpha, \theta) = \frac{\sin\left(\frac{kMd_1}{2}\cos\alpha\sin\theta\right)\sin\left(\frac{kNd_2}{2}\sin\alpha\sin\theta\right)}{M\sin\left(\frac{kd_1}{2}\cos\alpha\sin\theta\right)N\sin\left(\frac{kd_2}{2}\sin\alpha\sin\theta\right)}$$

where $k=2\pi/\lambda$, the sound production sensor array 44 includes N columns and M rows, a row pitch between any two adjacent rows of sound production sensors is $d_2$, a column pitch between any two adjacent columns of sound production sensors is $d_1$, and $\alpha$ and $\theta$ are angles of a direction of the sound wave in spherical coordinates.

In the following, a case where the sound production sensor array 44 is an array of 101×101 is taken as an example, 101 denotes the number of the sound production sensors in each row or column, i.e., M=N=101, and the row pitch and the column pitch are equal, i.e., $d_1=d_2=2.8$ mm, a radius r of the sound production sensor is 0.9 mm, and a gap between any two adjacent sound production sensors is 1 mm, and substituting these values into the above formula, the directivity angle of the sound wave transmitted by the sound production sensor array 44 can be obtained, as shown in FIG. 7, the directivity angle η is 10°, a directivity coverage area is a coverage area which is formed by taking a positive direction of the sound wave as the center line and deflecting the center line to both sides thereof by 10°, respectively, at a position having a distance of $L_1$ from a sound source (a center of the sound production sensor array 44), the maximum propagation distance of the sound source on both sides of the center line is $d_1$, and at a position having a distance of $L_2$ from the sound source, the maximum propagation distance of the sound source on both sides of the center line is $d_2$, in FIG. 7, $L_2=2\times L_1$, and accordingly, $d_2=2\times d_1$. Taking $L_1$ as 1 m and $d_1$ as 0.176 m, in the embodiment of the present disclosure, at a position having a distance of 1 m from the sound source, the maximum propagation distance of the sound wave on both sides of the center line is $2\times d_1=0.352$ m. If the person is in an area having a distance no greater than 0.176 m from the center line and has a distance of 1 m from the sound source, the person can hear the sound produced by the sound production sensor array 44.

Figure 8:
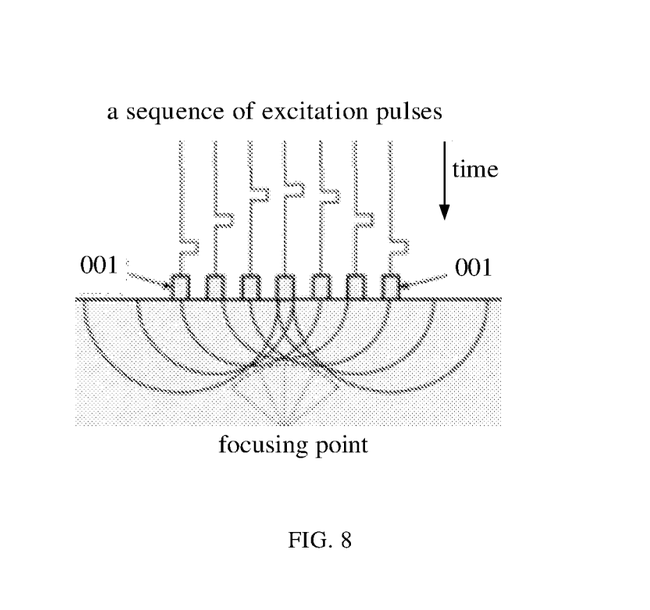
FIG. 8 is a schematic diagram illustrating a principle of focusing sound waves in an acoustic phased array method in a method for driving a sound producing device according to an embodiment of the present disclosure.
Figure 9:
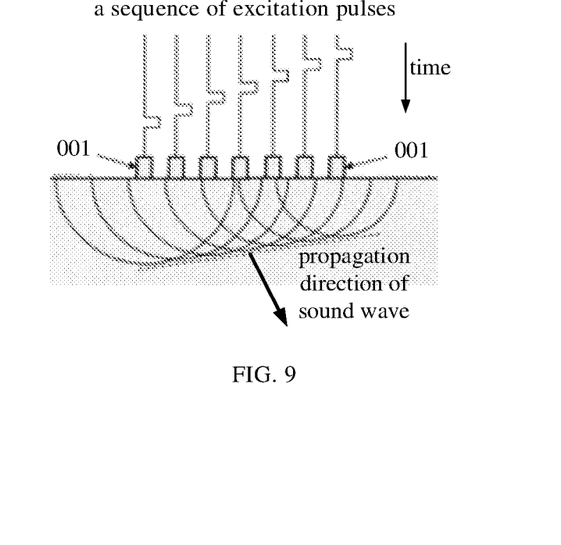
FIG. 9 is a schematic diagram illustrating a principle of sound wave deflection in an acoustic phased array method in a method for driving a sound producing device according to an embodiment of the present disclosure.

Further, as shown in FIG. 8 and FIG. 9, if the sound production sensors in the sound production sensor array 44 are controlled by using the acoustic phased array method, taking the sound production sensors being the piezoelectric sensors 001 as an example, the audio signal calculation module 32 in the control element 3 may obtain an audio signal with a delay time sequence by calculating excitation delay times of the piezoelectric sensors 001, and then transmit the audio signal to the audio processing module 41, and the audio processing module 41 drives the piezoelectric sensors (or sensor groups) with a sequence of excitation pulses with a corresponding time sequence according to the delay time sequence in the audio signal, so that phase differences occurs between the sound waves transmitted by the piezoelectric sensors 001, thereby affecting the interference result, that is, focusing (FIG. 8) and direction deflecting (FIG. 9) of the sound waves can be achieved, thereby the sound waves can be adjusted according to the person, and the sound production of the sound producing device is intelligentized. After the recognition element 1 recognizes the information relating to the person within the preset range, the control element 3 calculates, according to the position information of the person, an audio signal that enables the propagation direction of the sound wave to correspond to the position of the person, and transmits the audio signal to the audio processing module 41, the audio processing module 41 converts the audio signal into a corresponding driving signal, the driving signal is optimized by the power amplifier 42 and the impedance matching module 43 and then transmitted to the sound production sensor array 44, and the sound production sensor array 44 is driven to send out the sound wave with the propagation direction corresponding to the position of the person.

Further, based on the above, when the sound production sensor array 44 is driven by using the acoustic parametric array method, since the directivity of the sound wave is enhanced, the coverage area of the sound wave is relatively small, and if the person is not facing the center line of the sound production sensor array 44 and deviates from the center line by a relatively long distance, the person may not hear the sound. Therefore, the acoustic parametric array method and the acoustic phased array method may be combined, so that the directivity of sound wave is enhanced by the acoustic parametric array method, and then the sound production delay times of the sound production sensors are adjusted by the acoustic phased array method, therefore, the coverage area of the sound wave is increased.

Figure 10:
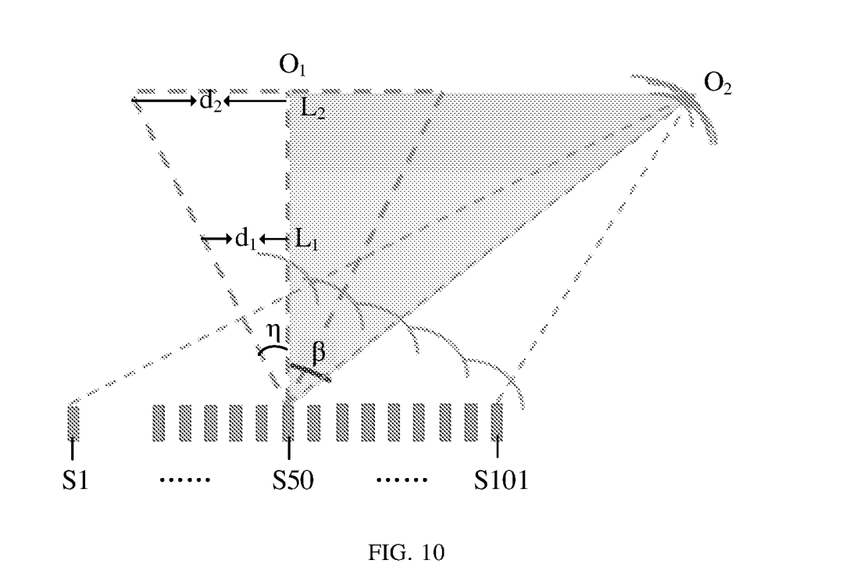
FIG. 10 is a schematic diagram illustrating a principle of combining an acoustic phased array method and a parametric acoustic array method in a method for driving a sound producing device according to an embodiment of the present disclosure.

Specifically, referring to FIG. 10, taking a case where the sound production sensor array 44 includes one row of sound production sensors as an example, the number of the sound production sensors is 101 (i.e., S1 ... S50 ... S101 in FIG. 10), the sound production sensor at the center is the fiftieth sound production sensor S50, and a gap between any two adjacent sound production sensors is 1 mm. Because of the auditory persistence effect of the human ear, the human ear cannot distinguish two sounds with a time difference less than 0.1 s, and may consider the two sounds having the time difference less than 0.1 s as a same sound. Therefore, the control element 3 may be configured to obtain a relatively large listening area by means of phase-controlled focus scanning method. The control element 3 controls the sound production sensor array 44 to propagate the sound wave along the center line of the sound production sensor array 44 (i.e., the direction that the fiftieth sound production sensor S50 faces) with a directivity angle η of 10° by using the acoustic parametric array method. Taking a case where the person is at the position $O_2$ as an example, that is, the person, at an angle β of 60° deviating from the center line and having a distance of 1 m from the sound production sensor array 44, desires to hear the sound wave, the sound production sensors are controlled by a pulse sequence, where starting from the first sound production sensor S1, the sound production sensors (S1 to S101) sequentially transmit the sound waves at a fixed interval of delay time (for example, 1 μs), the frequencies of the sound waves are the same as the frequency of the sound wave of the audible sound produced by the acoustic parametric array method, and a fixed phase difference occurs between the sound waves transmitted by the sound production sensors, and these sound waves interfere with each other to increase the coverage area of the sound waves. Finally, in the embodiment of the present disclosure, the sound waves can achieve a coverage area ranging from 20 mm to 2.8 m. In conclusion, the acoustic parametric array method may be used to drive the sound production sensor array 44 to increase the directivity of the sound waves, and then the acoustic phased array method may used to adjust the propagation angle and the coverage area of the sound waves, so that the sound waves can be adjusted according to the person, and the sound production of the sound producing device is intelligentized.

At S3, the directional sound production element 2 is controlled to send out sound waves according to the acquired (or calculated) audio signal.

Specifically, the control element 3 calculates a corresponding audio signal according to the information relating to the person, and then transmits the corresponding audio signal to the directional sound production element 2, where the audio signal includes the sound production frequencies or delay time sequence of the sound production sensors in the directional sound production element 2, so that the propagation direction and coverage area of the sound waves can be adjusted according to the person.

Correspondingly, an embodiment of the present disclosure further provides a display panel, which includes the above sound producing device.

The sound producing device may be integrated with the display panel, or may also be attached to the display panel and arranged outside the display panel.

Figure 11:
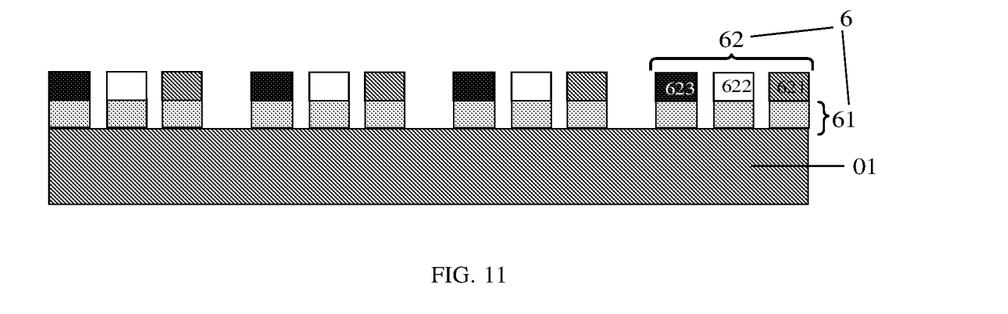
FIG. 11 is a schematic structural diagram of a display panel according to an embodiment of the present disclosure.
Figure 12:
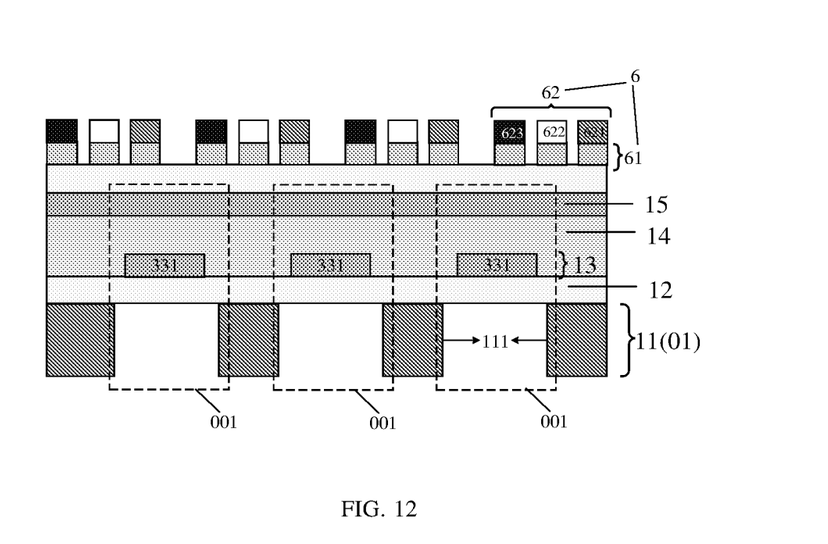
FIG. 12 is a schematic structural diagram of a display panel (which is integrated with a sound producing device) according to an embodiment of the present disclosure.

Specifically, referring to FIGS. 2, 11 and 12, in a case where the sound producing device is integrated with the display panel, the sound producing device includes the directional sound production element 2, and the directional sound production element 2 includes the sound production sensor array 44, as shown in FIG. 2, the sound production sensor array 44 includes the first substrate 11 and the sound production sensors (e.g., piezoelectric sensors 001) disposed on a side of the first substrate 11. As shown in FIG. 11, the display panel includes a second substrate 01 and a plurality of pixel units 6 disposed on a side of the second substrate 01. Each pixel unit 6 includes a pixel electrode 61 and a pixel 62, and the pixel 62 includes a plurality of sub-pixels, for example, a red sub-pixel 623, a green sub-pixel 622, and a blue sub-pixel 621. Referring to FIG. 12, the sound production sensor array 44 and the display panel may share a substrate, thus the sound producing device and the display panel are integrated to form a display panel having a sound production function, and the pixel units 6 are disposed on a side of the sound production sensors (piezoelectric sensors 001) away from the shared substrate (11 (01) in FIG. 12), so that the display panel has a sound production function and a thickness of the display panel can be reduced.

In some implementations, the sound producing device may also be externally disposed on the display panel, specifically, on a light exiting side of the display panel, the sound producing device is attached to the display panel through an adhesive layer, and externally disposed on the light exiting side of the display panel, and the sound producing device is a transparent sound producing device, which does not affect the light exiting rate of the display panel.

In some implementations, the sound producing device may be applied to various types of display panels, for example, the display panel may be an Organic Light Emitting Diode (OLED) display panel or a mini Light Emitting Diode (mini LED) display panel, which is not limited herein.

Further, the control element 3 in the sound producing device may be shared with a control chip (CPU) on a back panel of the display panel, the sound production sensor array 44 in the directional sound production element 2 is disposed on the light exiting side of the display panel, and the audio processing module 41, the power amplifier 42 and the impedance matching module 43 in the directional sound production element 2 may be disposed in a peripheral area, for example, an area where a pixel driving circuit is located, of the display panel. The recognition element 1 may be disposed at a side of the display panel, for example, at a side of the display panel where the camera is disposed. If the recognition element 1 is a camera, the camera of the recognition element 1 may be shared with the camera in the display panel.

Correspondingly, an embodiment of the present disclosure further provides a display apparatus, which includes the above display panel.

It should be noted that, the display apparatus provided in the embodiment of the present disclosure may be any product or component with a display function, such as a mobile phone, a tablet computer, a television, a display, a notebook computer, a digital photo frame, a navigator and the like. It should be understood by those skilled in the art that the display apparatus has other essential components, which are not described herein and should not be construed as limiting the present disclosure.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are also considered to fall within the scope of the present disclosure.

The invention claimed is:

1. A sound producing device, comprising: a recognition element, a directional sound production element and a control element; wherein,
   the recognition element is connected with the control element and is configured to acquire information relating to a person in a preset range and transmit the acquired information relating to the person to the control element; and
   the control element is connected with the directional sound production element and is configured to acquire a corresponding audio signal according to the acquired information relating to the person and control the directional sound production element to send out a sound wave according to the audio signal,
   wherein the information relating to the person comprises a total number of persons and positions of the persons with respect to the sound producing device,
   the control element is configured to calculate the corresponding audio signal according to the number of the persons and the positions of the persons with respect to the sound producing device, with the audio signal comprising frequencies and delays of sound waves transmitted from sound production sensors in the directional sound production element,
   wherein the control element is configured to control the frequencies of the sound waves transmitted from the sound production sensors in the directional sound production element based on an acoustic parametric array method, to adjust the directivity of the sound wave sent out from the directional sound production element, and control the delays of the sound waves transmitted from the sound production sensors in the directional sound production element based on an acoustic phased array method, to adjust a propagation direction and a coverage area of the sound wave sent out from the directional sound production element, so that the sound wave sent out from the directional sound production element covers all the persons in the preset range.

2. The sound producing device of claim 1, wherein the recognition element comprises:
   a person number recognition module configured to acquire the number of persons in the preset range; and
   a position recognition module configured to acquire position information of each person with respect to the sound producing device.

3. The sound producing device of claim 1, wherein the directional sound production element comprises a sound production sensor array and an audio processing module, the audio processing module is configured to convert the acquired audio signal into a driving signal to drive the sound production sensor array to produce sound.

4. The sound producing device of claim 3, wherein the sound production sensor array comprises a piezoelectric transducer array.

5. The sound producing device of claim 4, wherein the piezoelectric transducer array comprises a plurality of piezoelectric sensors;
   the piezoelectric transducer array comprises a first substrate, an elastic film layer disposed on a side of the first substrate, a first electrode disposed on a side of the elastic film layer away from the first substrate, a piezoelectric film disposed on a side of the first electrode away from the first substrate, and a second electrode disposed on a side of the piezoelectric film away from the first substrate, wherein
   the first electrode comprises a plurality of sub-electrodes, the sub-electrodes are distributed in an array and are disposed on a side of the elastic film layer away from the first substrate, and each sub-electrode corresponds to one piezoelectric sensor;
   the first substrate is provided with a plurality of openings, the openings correspond to the sub-electrodes one to one, and an orthographic projection of each sub-electrode on the first substrate falls within an orthographic projection of the opening corresponding to the sub-electrode on the first substrate.

6. The sound producing device of claim 5, wherein the elastic film layer comprises a polyimide film.

7. The sound producing device of claim 3, wherein the sound production sensor array comprises a plurality of sound production sensors, the sound production sensors being equally divided into a plurality of sensor groups, and each sensor group receives a corresponding driving signal.

8. The sound producing device of claim 7, wherein the sound production sensors are distributed in an array, and the sound production sensors in a same column or a same row are connected in series to form one of the sensor groups; or
   the sound production sensors are divided into a plurality of sub-arrays, and the sound production sensors in each sub-array are connected in series to form one of the transducer groups.

9. The sound producing device of claim 3, wherein the directional sound production element further comprises:
   a power amplifier, which is connected with the audio processing module and is configured to amplify the driving signal; and
   an impedance matching module, which is connected between the power amplifier and the sound production sensor array and is configured to match impedances of the power amplifier and the sound production sensor array, so as to optimize the driving signal.

10. The sound producing device of claim 1, wherein the control element comprises:
    a data recording module, which is connected with the recognition element and is configured to record the information relating to the person, transmitted by the recognition element; and an audio signal calculation module, which is connected between the data recording module and the directional sound production element and is configured to calculate an audio signal corresponding to the information relating to the person according to the acquired information relating to the person.

11. The sound producing device of claim 1, wherein the recognition element comprises any one of a piezoelectric transduction sensor, a light pulse sensor, a structured light sensor, or a camera.

12. A display panel, comprising the sound producing device according to claim 1.

13. The display panel of claim 12, wherein the sound producing device comprises a directional sound production element comprising a sound production sensor array, the sound production sensor array comprises a first substrate and a plurality of sound production sensors disposed at a side of the first substrate;
the display panel comprises a second substrate and a plurality of pixel units arranged on a side of the second substrate, wherein
the sound production sensor array and the display panel share a substrate, and the pixel units are disposed on a side of the sound production sensors away from the shared substrate.

14. The display panel of claim 12, further comprising an adhesive layer, wherein the sound producing device is attached to the display panel through the adhesive layer.

15. The display panel of claim 12, wherein the display panel is an organic light emitting diode display panel or a mini light emitting diode display panel.

16. A display apparatus, comprising the display panel according to claim 12.

17. A method for driving a sound producing device, comprising:

acquiring, by a recognition element, information relating to a person in a preset range and transmitting the information relating to the person to a control element; and acquiring, by the control element, a corresponding audio signal according to the information relating to the person and controlling a directional sound production element to send out a sound wave according to the audio signal, wherein the information relating to the person comprises a total number of persons and positions of the persons with respect to the sound producing device, the acquiring, by the control element, a corresponding audio signal according to the information relating to the person comprises:

calculating, by the control element, the corresponding audio signal according to the number of the persons and the positions of the persons with respect to the sound producing device, with the audio signal comprising frequencies and delays of sound waves transmitted from sound production sensors in the directional sound production element, wherein the frequencies of the sound waves transmitted from the sound production sensors in the directional sound production element are controlled by the control element based on an acoustic parametric array method, so that the directivity of the sound wave sent out from the directional sound production element is adjusted, and the delays of the sound waves transmitted from the sound production sensors in the directional sound production element are controlled by the control element based on an acoustic phased array method, so that a propagation direction and a coverage area of the sound wave sent out from the directional sound production element are adjusted, with the sound wave sent out from the directional sound production element covering all the persons in the preset range.

* * * * *